United States Patent [19]

Harada et al.

[11] Patent Number: 5,750,219
[45] Date of Patent: May 12, 1998

[54] ESTER COPOLYMER RESIN, ALLOY THEREOF AND PACKAGING MATERIAL USING THE SAME

[75] Inventors: Yasuhiro Harada; Shinichiro Mori; Kayo Hasegawa; Junichi Kitagawa; Yoichiro Inoue; Eiichi Kai; Shinichi Sekine; Yuuzou Fukawa; Takashi Shirane; Kazuhiro Hamauji, all of Tokyo, Japan

[73] Assignees: NKK Corporation; Kyodo Printing Co., Ltd., both of Tokyo, Japan

[21] Appl. No.: 519,608

[22] Filed: Aug. 25, 1995

[30] Foreign Application Priority Data

Aug. 25, 1994 [JP] Japan .................. 6-201042
Feb. 14, 1995 [JP] Japan .................. 7-049209
Mar. 17, 1995 [JP] Japan .................. 7-059370
Jun. 22, 1995 [JP] Japan .................. 7-179575

[51] Int. Cl.$^6$ .................. B29D 22/00; B32B 1/08; C08G 63/02
[52] U.S. Cl. .................. 428/35.7; 528/272; 528/298; 528/307; 528/308; 528/308.6; 528/302; 525/437; 525/444; 428/35.7; 428/36.92
[58] Field of Search .................. 528/272, 298, 528/302, 307, 308, 308.6; 525/437, 444; 428/35.7, 36.92

[56] References Cited

FOREIGN PATENT DOCUMENTS 0111810  6/1994  European Pat. Off. .

OTHER PUBLICATIONS

Chemical Abstracts, vol. 121, No. 2, Jul. 11, 1994, Abstract No. 10258, XP002005351, JP-A-06016793 (Jan. 25, 1994).
Patent Abstracts of Japan, vol. 13, No. 296, Jul. 10, 1989, JP-A-01-085732 (Mar. 30, 1989).
Research Disclosure, No. 283, pp. 705–709, Nov. 1987, New York, NY.
Research Disclosure, No. 284, Dec. 1987, pp. 779–782, New York, NY.
Chemical Abstracts, vol. 114, No. 8, Feb. 25, 1991, Abstract No. 63869, (XP002005352) JP-A-02191638 (Jul. 27, 1990).
Chemical Abstracts, vol. 122, No. 8, Feb. 20, 1995, Abstract No. 92745, (XPP002005353) JP-A-06202277 Jul. 22, 1994.
Patent Abstracts of Japan, vol. 13, No. 504, Nov. 13, 1989, JP-A-01201324 (Aug. 14, 1989).
Chemical Abstracts, vol. 123, No. 20, Nov. 13, 1995, Abstract No. 275646 (XP002005354) RN–161911–39–3, vol. 18, No. 5, May 1994.
Chemical Abstracts, vol. 122, No. 16, Apr. 17, 1995, Abstract No. 189773, (XP002005355) JP-A-06271829 Sep. 27, 1994).

*Primary Examiner*—Samuel A. Acquah
*Attorney, Agent, or Firm*—Sughrue, Mion, Zinn, Macpeak & Seas, PLLC

[57] ABSTRACT

1. An ester copolymer resin having a general formula [I].

$$HO\text{--}(COArCOORO)_n\text{--}H \qquad [I]$$

wherein Ar represents 2,6-naphthalene group or phenylene group, R represents ethylene group or 1,4-cyclohexylene group, and n is a number of 100 to 1000 and a polymer alloy having a solubility parameter of 10.8 to 11.9 consisting essentialy of the ester copolymer and a polycarbonate resin are provided. The ester resin and the alloy are transparent and has a beat resistance and a hot water resistance (resistance to whitening) resisting sterilization of food, a good heat sealability to aluminum closure, and recycling ability with PET resin.

12 Claims, 3 Drawing Sheets

ESTER COPOLYMER RESIN, ALLOY THEREOF AND PACKAGING MATERIAL USING THE SAME

BACKGROUND OF THE INVENTION

This invention relates to an ester copolymer excellent in heat resistance and hot water resistance (resistance to whitening) resin, an alloy thereof and a polycarbonate resin, and a packaging material, such as cup, bottle, sheet or film, using the same.

In the field of food packaging, glass was mainly used because of requiring hot water resistance (resistance to whitening), transparency, etc. On the other hand, plastics excellent in heat resistance have been developed, and the quantity of the plastics used for food packaging gradually increases. Particularly, polyethylene terephthalate (PET) resin which belongs to polyester resin is widely used as a material for packaging foods, because of being excellent in physical and chemical properties and of arrangement of recycling system. Polyethylene-2,6-naphthalate (PEN) resin having a naphthalene skeleton is excellent in mechanical strength (Young's modulus, breaking strength), heat resistance (long-term heat stability, dimensional stability), chemical properties (chemical resistance, gas barrier), etc. due to inflexibility and flatness of its molecular chain, compared with PET resin, and is recently noted.

Heretofore, various modified PEN resins have been developed in order to improve various properties. For example, a modified PEN resin is an ester copolymer resin synthesized using 1,4-cyclohexanedimethanol in addition to ethylene glycol as the glycol component, in order to improve optical properties, transparency, etc.. (Japanese Patent KOKAI 1-201324, 1-2-01325, 3-122116). Another modified PEN resin is synthesized using terephthalic acid in addition to 2,6-naphthalic acid as the carboxylic acid componenet (Japanese Patent KOKOKU 49-22957).

In the case of modified PET resin, an ethylene terephthalate copolymer resin sheet for thermoforming is known wherein 1,4-cyclohexanedimethanol is copolymerized with varying the cis/trans ratio to improve heat resistance (Japanese Patent KOKAI 5-140278). A multilayer film is known composed of a PEN resin and polyethylene terephthalate and an ethylene terephthalate copolymer (Japanese Patent KOKAI 64-85732).

Containers for packaging foods require, in general, heat resistance and hot water resistance (resistance to whitening) capable of resisting sterilization conditions of foods. According to the sterilization in the manufacture standard described in Brief of Specifications for Components, Standards for Manufacture and standards for Storing for Each Food of Specification Standards for Foods, Additives, etc. (Notification No. 370 of the Ministry of Welfare on Dec. 28, 1959, Last Revision on May 31, 1986) established based on Article 7, Paragraph 1 of the Food Sanitation Act, it is obligated that foods having a pH of 4.0 to 4.6 and a water activity (Aw) of less than 0.94 must be sterilized under the condition at least at 85° C. for 30 minutes (cold spot) and that foods having a pH of less than 4.0 and a water activity (Aw) of less than 0.94 must be sterilized under the conditions at least at 65° C. for 10 minute (cold spot). The regulations further require that containers for packaging foods must be transparent capable of confirming packaged materials, and recycling ability is also required in view of recent environmental problems.

However, glass used as a packaging material has heat resistance, hot water resistance (resistance to whitening) and transparency, but has problems in heavy weight, handling during transportation, and danger upon breaking. On the other hand, packaging materials made of PET resin, in general, are deformed under high temperature high humidity conditions. For example, when they are used as a packaging material for foods subjected to hot water sterilization, they are deformed even at 65° C. The aforementioned ethylene terephthalate copolymer resin sheet for thermoforming has no heat resistance at 87° C., and has also a disadvantage that whitening occurs by keeping under high temperature high humidity conditions for several tens minutes to decrease transparency. Accordingly, this sheet also cannot be used as a packaging material subjected to heat sterilization.

On the other hand, although PEN resins have heat resistance capable of resisting heat sterilization by hot or boiling water at 90° to 100° C. and hot water resistance (resistance to whitening), they are inferior in heat sealability to cover materials which is necessary for packaging materials. That is, PEN resins are inferior in heat sealability to aluminum closures which are a laminate of an aluminum foil having a polyester adhesive layer as the innermost layer. Furthermore, according to using conditions, adhesive strength gradually decreases. PEN resins cannot be incorporated into PET resin recycling system because whitening occurs by melt kneading of PET resin with PEN resin. Accordingly, PEN resin has a problem in recycling similar to the aforementioned multilayer film.

SUMMARY OF THE INVENTION

An object of the invention is to provide an ester copolymer resin which is transparent and has a heat resistance and a hot water resistance (resistance to whitening) capable of resisting sterilization conditions at 85° C. for 30 minutes (cold spot) or exhibiting more sterilizability, has heat sealability to aluminum closures which are a laminate of an aluminum foil having a polyester adhesive layer as the innermost layer, and has recycling ability with PET resins used as a packaging material.

Another object of the invention is to provide a polymer alloy which is excellent in transparency and UV shielding ability, in heat resistance and hot water resistance (resistance to whitening) capable of resisting sterilization conditions at 85° C. for 30 minutes (cold spot) or exhibiting more sterilizability, in impact resistance (dropping strength under cold temperatures), in gas barrier, and in heat sealability to aluminum closures which are a laminate of an aluminum foil having a polyester adhesive layer as the innermost layer.

Another object of the invention is to provide a packaging material using the above ester copolymer resin or an alloy thereof.

The inventors investigated earnestly in order to achieve the above objects, and noticed that PET resin is used in quantity, and now becomes a resin of which recycling has been developed greatly as a countermeasure to environmental pollution. Thereupon, resins which do not affect transparency, heat resistance and strength of PET resin by blending become recyclable resins. Thus, they succeeded to develop a novel ester copolymer resin which resolves the aforementioned problems by improving PET resin and PEN resin to complete the invention. The ester copolymer resin has good heat sealability and recycling ability (together with PET resin) with keeping transparency, heat resistance and hot water resistance (resistance to whitening).

Thus, the present invention provides, an ester copolymer resin having a general formula [I]

$$HO+COArCOORO\!+\!_nH \qquad [I]$$

wherein Ar represents 2,6-naphthalene group or phenylene group, R represents ethylene group or 1,4-cyclohexylene group, and n is a number of 100 to 1000, a polymer alloy having a volubility parameter of 10.8 to 11.9 and consisting essentially of the ester copolymer resin and a polycarbonate resin, and packaging materials using the ester copolymer resin or the polymer alloy.

DETAILED DESCRIPTION OF THE INVENTION

Figure 1:
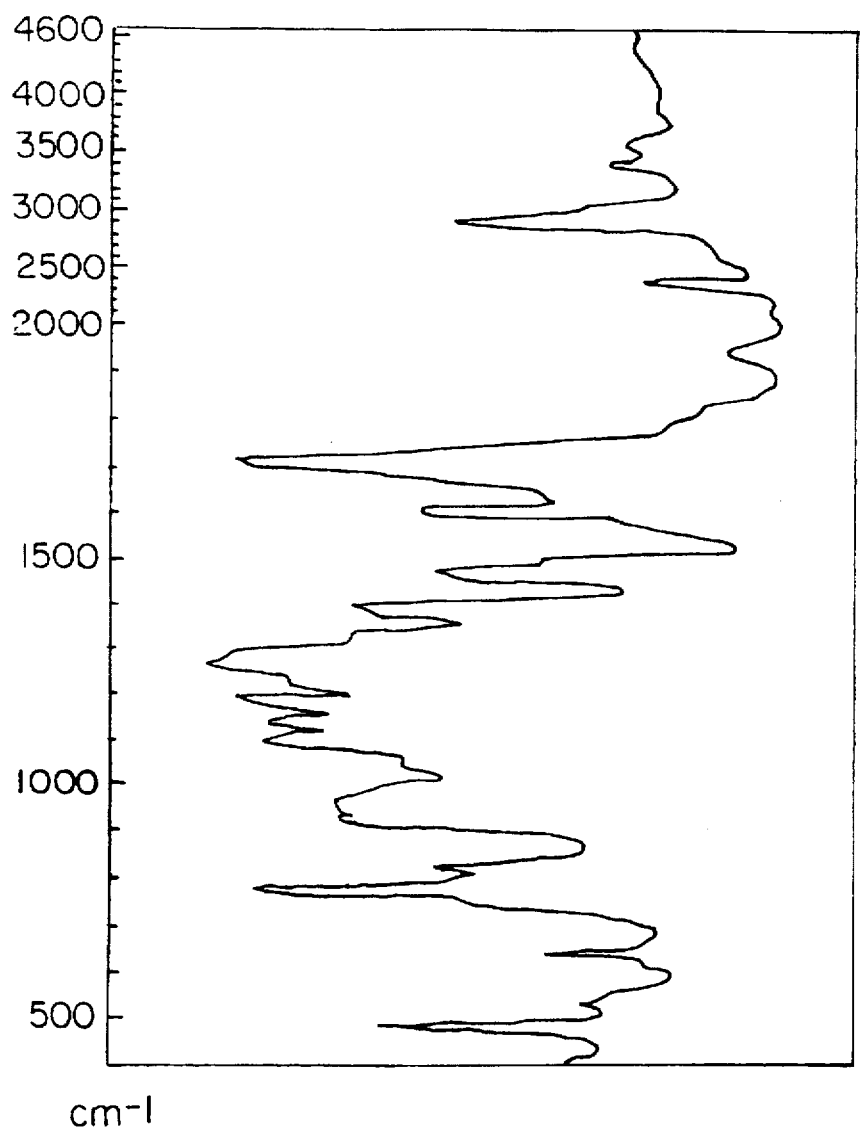
FIG. 1 is an infrared absorption spectra of the ester copolymer resin produced in Example 1.

In the ester copolymer of the invention, it is preferable that the Ar consists of 30 to 98 mol. %, more preferably 40 to 90 mol. %, of 2,6-naphthalene group, i.e. 70 to 2 mol. %, more preferably 60 to 10 mol. %, of phenylene group. When the ratio of 2,6-naphthalene group exceeds 98 mol. %, i.e. the ratio of phenylene group is less than 2 mol. %, heat sealability and recycling ability are inferior. On the other hand, when the ratio of 2,6-naphthalene group is less than 30 mol. %, i.e. the ratio of phenylene group exceeds 70 mol. %, heat resistance, hot water resistance and resistance to whitening are degraded.

The R preferably consists of 5 to 90 mol. %, more preferably 10 to 70 mol. %, of ethylene group, i.e. 95 to 10 mol. %, more preferably 90 to 30 mol. %, of 1,4-cyclohexylene group. When the ratio of ethylene group is less than 5 mol. %, i.e. the ratio of 1,4-cyclohexylene group exceeds 95 mol. %, crystallinity proceeds and resistance to whitening in hot water is degraded. When the ratio of ethylene group exceeds 90 mol. %, i.e. 1,4-cyclohexylene group is less than 10 mol. %, heat-sealability and recycling ability are degraded and the ester copolymer resin becomes unsuitable for packaging containers.

A suitable cis/trans ratio of the 1,4-cyclohexylene group is 0/100 to 40/60, preferably 0/100 to 30/70. When the ratio of cis form exceeds 40 mol. %, i.e. the ratio of trans form is less than 60 mol. %, heat resistance is degraded and the ester copolymer resin becomes unsuitable for packaging containers.

A suitable polymerization degree n is 100 to 1,000, preferably 100 to 400.

As the decarboxylic acid component which is a raw material of the ester copolymer resin of the invention, 2,6-naphthalene dicarboxylic acid or a lower alkyl ester thereof and terephthalic acid or a lower alkyl ester are used. In both lower alkyl esters, the number of carbon atoms is 1 to 8, preferably 1 to 5. The both lower alkyl esters may be monoester as well as diester. Illustrative of the 2,6-naphthalene dicarboxylic acid lower esters are 2,6-dimethylnaphthalate, 2,6-diethylnaphthalate, 2,6-dipropylnaphthalate, 2,6-dibutylnaphthalate, 2,6-dipentylnaphthalate, 2,6-dihexylnaphthalate, 2,6-diheptylnaphthalate and 2,6-dioctylnaphthalate. Particularly preferred ones are 2,6-dimethylnaphthalate, 2,6-diethylnaphthalate, 2,6-dipropylnaphthalate, 2,6-dibutylnaphthalate, 2,6-dipentylnaphthalate. Illustrative of the terephthalic acid lower alkyl esters are dimethylterephthalate, diethylterephthalate, dipropylterephthalate, dibutylterephthalate, dipentylterephthalate, dihexylterephthalate, diheptylterephthalate and dioctylterephthalate. Particularly preferred ones are dimethylterephthalate, diethylterephthalate, dipropylterephthalate, dibutylterephthalate, dipentylterephthalate.

As the glycol components, ethylene glycol and 1,4-cyclohexanedimethanol are used.

It is preferable to carry out the production of the ester copolymer of the invention by dividing into a first process of conducting ester interchange reaction between the dicarboxylic acid components and the glycol components and a second process of conducting condensation polymerization of low polymer of the reaction product obtained in the first process.

In the first process of the ester interchange reaction, any combination of the dicarboxylic acid components and the glycol components is possible. That is, 2,6-naphthalene dicarboxylic acid or a lower alkyl ester thereof may be combined with ethylene glycol, 1,4-cyclohexanedimethanol or a mixture thereof, and terephthalic acid or a lower alkyl ester thereof may be combined with ethylene glycol, 1,4-cyclohexanedimethanol or a mixture thereof. Furthermore, the ester interchange reaction 2,6-naphthalene dicarboxylic acid or a lower alkyl ester thereof may conducted separate from the ester interchange reaction of terephthalic acid or a lower alkyl ester thereof. One of the ester interchange reactions may be preceded, and the components for the other may be added thereto in the midway or after finished.

A preferable method is to combine a 2,6-naphthalene dicarboxylic acid lower alkyl ester with ethylene glycol and to combine a terephthalic acid lower alkyl ester with 1,4-cyclohexanedimethanol, and both ester interchange reactions are carried out separately. Both ester interchange reaction products of low polymers are subjected to the second process.

Another preferable method is to combine a terephthalic acid lower alkyl ester with 1,4-cyclohexanedimethanol, and ester interchange reaction is carried out. Subsequently, a 2,6-naphthalene dicarboxylic acid lower alkyl ester and ethylene glycol are added to the reaction mixture, and further continue ester interchange reaction. The low polymeres thus obtained by the ester interchange reaction are subjected to the second process.

The esterification reaction is carried out by reacting between 2,6-naphthalene dicarboxylic acid, terephthalic acid and about 0.8 time mole or more, preferably 1 to 5 times moles of glycol components.

The ester interchange reaction in the first process can be carried out according to a known method.

Ester interchange catalyst may be selected from those usable for polyester sysnthesis such as polyethylene terephthalate, such as carboxylic acid alcoholates, oxides and salts such as acetate, of a metal selected from the group consisting of Li, Na, K, Mg, Ca, Sr, Ba, Zn, Cd, Al, Ge, Sn, Pb, Ti, Cr, Mn, Fe, Ni, Sb and Co. Two or more catalysts may be combined. A suitable amount of the catalyst is 10 to 1,000 m mol. % of dicarboxylic acid components. A suitable temperature of ester interchange reaction is 150° to 260° C., preferably 220° to 240° C. The reaction time is to reach a preseribed reaction rate, in general 80% or more, until evolution of lower alcohols which are reaction products becomes almost none.

In the second process, condensation polymerization of the low polymers obtained in the first process is conducted by heating under reduced pressure conditions. Before or after the start of the second process, actually after the first process is substantially terminated and before intrinsic viscosity exceeds 0.2, a condensation polymerization catalyst, such as carboxylic acid alcoholates, oxides and salts such as acetate, of a metal selected from the group consisting of Mn, Ge, Sn, Ti and Sb, and condensation polymerization is carried out. A suitable amount of the catalyst is 10 to 1,000 m mol. % of dicarboxylic acid components. On that occasion, one or more additives, such as light resisting agent, weather resisting agent, antistatic agent, heat stabilizer, light-shielding agent or pigment, may be added. Furthermore, the additives may be added in the first process and/or the middle stage or the latter stage and/or immediately before film molding. A suitable blending amount is 1 to 1,200 m mol. %, preferably 5 to 1,000 m mol. %.

After adding the condensation polymerization catalyst, polymerization of the second process wherein a high polymerization degree copolymer is obtained by deglycol reaction is carried out.

In the polymerization of the second process, reaction temperature gradually elevates by heating with the progress of the reaction. That is, at the initial stage, the reaction temperature is made 200° to 250° C., and at the final stage, it is made 270° to 310° C., by heating. The reaction pressure is preferably gradually reduced from ordinary pressure at the initial stage to 10 mm Hg or less, preferably 1 mm Hg or less, at the final stage. The polymerization time by the melting method is set by the limiting viscosity of the reacion product, but too long time is disadvantageous in economical viewpoint and thermal degradation which proceeds simultaneously. A suitable time is 0.5 to 5 hours, preferably 1 to 4 hours.

In the method of combining a 2,6-naphthalene dicarboxylic acid lower alkyl ester with ethylene glycol and combining a terephthalic acid lower alkyl ester with 1,4-cyclohexanedimethanol, and conducing both ester interchange reactions, and then conducting condensation polymerization by mixing both reaction products, in the first process, for example, 2,6-dimethylnaphthalate (A) and ethylene glycol (C) and manganese acetate (e.g. 0.02 mol. %) are placed in a reaction vessel, and ester interchange reaction is conducted at a reaction temperature of 180° to 240° C., until distillates do not effuse, to obtain a low polymer (E). Similarly, dimethylterephthalate (B) and 1,4-cyclohexanedimethanol (D) and titanium tetrabutoxy monomer (e.g. 0.02 mol. %) are placed in a reaction vessel, and ester interchange reaction is conducted at a reaction temperature of 180° to 240° C., until distillates do not effuse, to obtain a low polymer (F). If necessary, (A) and (D) and titanium tetrabutoxy monomer (e.g. 0.02 mol. %) are placed in a reaction vessel, and ester interchange reaction is conducted at a reaction temperature of 180° to 270° C., until distillates do not effuse, to obtain a low polymer (G).

Ester interchange catalyst may be selected from those usable for polyester sysnthesis such as polyethylene terephthalate, such as carboxylic acid alcoholates, oxides and salts, and can be selected from aforementioned ones. However, carboxylic acid, alcoholate, oxide or acetate of titanium is used for the synthesis of the low polymer (F) and (G).

Subsequently, the second process is conducted wherein the low polymer (E) and (F) obtained in the first process are blended in a melted state. In order to control components, the low polymer (G) may further be blended. To the melted mixture, trimethyl phosphate (e.g. 0.04 mol. %) and then antimony trioxide (e.g. 0.02 mol %) are added. The second process are conducted thereafter according the aforementioned known method.

In the method of conducting ester interchange reaction between a terephthalic acid lower alkyl ester (B) and 1,4-cyclohexanedimethanol (D), conducting ester interchange reaction again by blending a 2,6-naphthalene dicarboxylic acid lower ester and ethylene glycol with the reaction product, and conducting condensation polymerization of the reaction products thus produced, in the first process, for example, dimethylterephthalate (B) and 1,4-cyclohexanedimethanol (D) and titanium tetrabutoxy monomer (e.g. 0.02 mol. %) are placed in a reaction vessel, and ester interchange reaction is conducted at a reaction temperature of 180° to 240° C., until distillates do not effuse, to obtain a low polymer (F). 2,6-dimethylnaphthalate (A) and ethylene glycol (C) and manganese acetate (e.g. 0.02 mol %) are added to the low polymer (F) in the reaction vessel, and ester interchange reaction is conducted at a reaction temperature of 180° to 240° , until distillates do not effuse, to obtain a low polymer (H). To the low polymer (H), trimethyl phosphate (e.g. 0.04 mol. %) and then antimony trioxide (e.g. 0.02 mol %) are added. The second process are conducted thereafter according the aforementioned known method to obtain the ester copolymer.

According to the known production, since reactivity of each component is different, the composition of each low polymer produced by ester interchange reaction is different, and accordingly, it is difficult to control copolymerization. As a result, the most units contained in the produced polyester are the combination of terephthalic acid lower alkyl ester (B) and ethylene glycol (C) because of the greatest reactivity of them. The combination is the same as the unit constituting PET resin, and is inferior to other produced units in heat resistance and hot water resistance (resistance to whitening). On the other hand, in the above method, ester interchange reaction is previously carried out between slow reaction rate monomers or beween monomers having a high heat resistance, and thereby, the production of units composed of terephthalic acid lower alkyl ester (B) and ethylene glycol (C). It was found that, by combining the low polymers to conduct condensation polymerization, heat resistance and hot water resistance are further improved.

After finishing the polymerization by the melting method, in general, molten resin is pressurized by an inert gas, particualrny nitrogen gas, ejected, cooled, cut and then arranged to a desired shape.

A suitable intrinsic viscosity of the ester copolymer resin is 0.5 to 1.2, more preferably 0.5 to 0.9, particularly preferably 0.55 to 0.7, for packaging containers for foods. When the intrinsic viscosity is less than 0.5, molded articles are fragile. When the intrinsic viscosity exceeds 0.9, difficulty occurs in molding because of a high viscosity.

Subsequently, the ester copolymer resin is subjected to drying process, because when melt extrusion is conducted in the presence of water content, molecular weight sharply decreases by the hydrolysis of the copolymer. Through the drying process, it is necessary that the water content of the ester copolymer resin after drying is 100 ppm or less, preferably 50 ppm or less. The drying may be conducted by streaming air or inert gas or under reduced pressure, and drying conditions, such as drying temperature and time, drying means, drying apparatus, etc. may be thoes employed for thermoplastic resins, particularly polyester resins. For example, since melt adhesion is liable to occur at 120° C. or more, drying temperature is preferably less than 120° C. Drying apparatus may be vacuum dryer, rotary dryer, fluidized dryer, channel-formed dryer, stationary dryer, microwave dryer or a combination thereof.

By blending polycarbonate resin with the ester polymer resin, particularly, impact resistance under cold temperatures, gas barrier and UV shielding can be improved.

The polymer alloy of the ester copolymer resin and a polycarbonate resin has a solubility parameter of 10.8 to 11.9, preferably 11.1 to 11.9. When the solubility parameter is less than 10.8, UV shielding ability and gas barrier are inferior. When the solubility parameter exceeds 11.9, transparency is degraded.

The solubility parameter ($\delta$) is a measure of compatibility of polymer materials, and is defined by Fedors as the following formula:

$$\delta = (Ev/v)^{1/2} = (\Sigma \Delta e / \Sigma \Delta v_i)^{1/2}$$

wherein $\Delta e_i$ and $\Delta v_i$ are evaporation energy and molar volume of each atom or atomic group. Provided that, as to compounds having a Tg of 25° C. or more, when the number n of atoms of main chain in a minimum repeating unit of a polymer is less than 3, 4n is added, and when the a is 3 or more, 2n is added to the above molar volume $\Delta v_i$, respectively.

In the case of the polymer alloy it is preferable that the Ar of the ester copolymer resin consists of 5 to 95 mol. % of 2,6-naphthalene group, i.e. 95 to 5 mol. % of phenylene group. When the ratio of 2,6-naphthalene group exceeds 95 mol. %, i.e. the ratio of phenylene group is less than 5 mol. %, heat sealability and transparency are inferior. On the other hand, when the ratio of 2,6-naphthalene group is less than 5 mol. %, i.e. the ratio of phenylene group exceeds 95 mol. %, heat resistance, hot water resistance (resistance to whitening) are degraded.

The R preferably consists of 5 to 47 mol. % of ethylene group, i.e. 95 to 53 mol. % of 1,4-cyclohexylene group. When the ratio of ethylene group is less than 5 mol. %, i.e. the ratio of 1,4-cyclohexylene group exceeds 95 mol. %, resistance to whitening in hot water is degraded. When the ratio of ethylene group exceeds 47 mol. %, i.e. 1,4-cyclohexylene group is less than 59 mol. %, heat sealability and transparency are degraded and the ester copolymer resin becomes unsuitable for packaging containers.

A suitable cis/trans ratio of the 1,4-cyclohexylene group is 0/100 to 40/60, preferably 0/100 to 30/70.

The polycarbonate resin used for the polymer alloy has diphenylalkane as the skeleton, and produced from 4,4'-dihydroxyphenylalkane and phosgene or diphenyl carbonate. A representative 4,4'-dihydroxyphenylalkane is 2,2-bis(4-hydroxyphenyl)propane. A suitable average molecular weight of the polycarbonate resin is 10,000 to 100,000 e.g. 21,000 to 23,000 and 23,000 to 25,000. When the average molecular weight exceeds 100,000, molding is difficult because of high viscosity. When the average molecular weight is less than 10,000, molded articles are fragile. The above polycarbonate resin is excellent in heat resistance and transparency, and exhibits good compatibility with the ester copolymer resin of the invention, particularly having an Ar consisting of 5 to 95 mol. % of 2,6-naphthalene group, i.e. 95 to 5 mol. % of phenylene group, a R consisting of 53 to 95 mol. % of 1,4-cyclohexylene group, i.e. 47 to 5 mol. % of ethylene group.

A suitable blend ratio by weight of the ester copolymer resin/polycarbonate resin is 2/98 to 95/5, because of excellent transparency, heat resistance, hot water resistance, UV shielding ability (weather resistance) and moldability. A preferable blending ratio is 50/50 to 80/20, because of excellent impact resistance at a cold temperature, gas barrier not less than 4 times that of PET resin, and heat sealability to PET resin, as well as excellent transparency, heat resistance, hot water resistance, UV shielding ability weather resistance) and moldability.

The ester copolymer resin or the polymer alloy can be molded into a film or sheet, by putting the dried resin pellets in an extruder, and extruding from a T die at an extrusion temperature of 250° to 290° C., followed by cooling to solidify on a cooling drum at 30° to 80° C. to form unstretched sheet. When the extruder is a twin-screw extruder rotating in the same direction (one or more vents), undried resin can be directly extruded. The cooling means may be two stage cooling, cooling by putting into water or a cooling medium or the like (Japanese Patent KOKOKU 47-39929, 47-10394). Unstretch sheet can also be formed by the solvent casting, calendering or the like. The thickness of the film and sheet is not limited, and is made to a thickness suitable for use. In the case that the sheet is molded into an article having a prescribed shape by vacuum forming, air-pressure forming, a preferable thickness of the sheet is 200 to 2,000 μm.

The ester copolymer resin or the polymer alloy can be molded into a packaging container. A molding method comprises heating the above sheet by a far infrared heater or a near infrared heater, and thereafter or simultaneously forming into a container having a prescribed shape, such as a cup using a mold by hot plate forming, vacuum forming (straight forming or drape forming), air-pressure forming, vacuum air-pressure forming or the like. A suitable heating temperature varies according to resin composition and the like, and in general, is in the range of 110° to 150° C. as the surface temperature of the sheet.

The packaging container can also be molded by various molding processes, such as one of injection molding, injection blow molding, injection blow molding with biaxial stretching or the like. In addition, the packaging container can be molded by molding a preform by injection molding and then forming the container by blow molding of the preform with heating (stretching), or molding a pipe-shaped intermediate material by extrusion molding, forming the bottom portion by fusing an end, pressure-forming the other end into an opening, and then blowing with stretching.

After containing a content, such as food, a cover material is attached to the container. A cover material is an aluminum closure (aluminum foil) or a film closure having a polyester adhesive layer as the innermost layer, which is attached by pressure bonding or heat sealing. Another cover material as EOE (easy open end) composed of mainly a metal, which is attached by double winding with fastening. In the case of attaching the cover material by heat sealing, a usual sealing agent for polyester can be used, such as a polyester addhesive of PET copolymer, PBT copolymer, PCT copolymer or PEN copolymer. Heat sealing temperature is 140° to 240° C., although it varies by heat sealing agent and the like.

The packaging mateiral, such as the packaging container, is suitable for foods. Particularly, foods having a pH of 4.0 to 4.6 and a water activity (Aw) of less than 0.94 are sterilized under the conditions at least at 85° C. for 30 minutes (cold spot), and the packaging material of the invention has a heat resistance and hot water resistance (resistance to whitening) capable of resisting the above sterilization, and has transparency and sufficient mechanical strength. The packaging material is not deformed, whitened nor shrinked by treating at 87° C. for 20 minutes, at 85° C. for 30 minutes or more effective conditions for sterilization. The packaging material is also excellent in heat sealability with aluminum closures and film closures, in recycling ability with PET resin, in oxygen gas barrier, and in impact strength. The packaging material made of the polymer alloy is further excellent in impact resistance under cold temperatures, gas barrier and UV shielding ability.

EXAMPLES

Measurement

Intrinsic Viscosity:

A resin to be measured was dissolved in a solvent mixture of phenol and 1,1,2,2-tetrachloroethane (60/40 w/w) in a concentration of 0.2 to 1.0 g/dl at 100° C. for 1 hour, and each viscosity was measured using a Ubbelohde's capillary viscometer at 35° C. The intrinsic viscosity was determined by extrapolating the solution viscosity values to 0 g/dl.

Infrared Absorption Spectra:

Measured using an infrared spectrometer ("FT/1R-5000", Nippon Bunko)

Thermal Analysis:

Using a differential scanning calorimeter (DSC), a sample to be measured was heated at 10° C./min., and a glass transition point was determined by the transition point appearing therein.

Composition Ratio:

A polymer sample was hydrolyzed in a basic solution, and each component of 2,6-naphthalene dicarboxylic acid/ terephthalic acid and 1,4-cyclohexanedimethanol/ethylene glycol were measured by gas chromatography Heat Resistance, Hot Water Resistance:

The F value (lethal time by thermal sterilization, of the food having a pH of less than 4.0 and a water activity (Aw) of less than 0.94 is F (5° C./65° C.), and the F value of the food having a pH of 4.0 to 4.6 and a water activity (Aw) of less than 0.94 is F (8° C./85° C.). The relation between sterilization temperature and time is shown in Table 1. The heat resistance of each container can be determined experimentally by using table 1. A 100 cc container requires heat resistance at 87° C. for 20 minutes and furthermore at 89° C. for 12 minutes.

TABLE 1

Relation between Sterilization Temperature and Time

| [ Sterization time at each temperature corresponding to 65° C. for 10 minutes, in the case of Z = 5° C. ] | | [ Sterization time at each temperature corresponding to 85° C. for 30 minutes, in the case of Z = 8° C. ] | |
|---|---|---|---|
| TEMP (C) | F (5° C./65° C.) (min) | TEMP (C) | F (8° C./85° C.) (min) |
| 56.0 | 630.9573 | 75.0 | 533.4838 |
| 57.0 | 398.1071 | 76.0 | 400.0564 |
| 58.0 | 251.1886 | 77.0 | 300.0000 |
| 59.0 | 158.4893 | 78.0 | 224.9682 |
| 60.0 | 100.0000 | 79.0 | 168.7023 |
| 61.0 | 63.0957 | 80.0 | 126.5089 |
| 62.0 | 39.8107 | 81.0 | 94.8683 |
| 63.0 | 25.1188 | 82.0 | 71.1412 |
| 64.0 | 15.8489 | 83.0 | 53.3483 |
| 65.0 | 10.0000 | 84.0 | 40.0056 |
| 66.0 | 6.3095 | 85.0 | 30.0000 |
| 67.0 | 3.9810 | 86.0 | 22.4968 |

TABLE 1-continued

Relation between Sterilization Temperature and Time

| [ Sterization time at each temperature corresponding to 65° C. for 10 minutes, in the case of Z = 5° C. ] | | [ Sterization time at each temperature corresponding to 85° C. for 30 minutes, in the case of Z = 8° C. ] | |
|---|---|---|---|
| TEMP (C) | F (5° C./65° C.) (min) | TEMP (C) | F (8° C./85° C.) (min) |
| 68.0 | 2.5118 | 87.0 | 16.8702 |
| 69.0 | 1.5848 | 88.0 | 12.6508 |
| 70.0 | 1.0000 | 89.0 | 9.4868 |
| 71.0 | 0.6309 | 90.0 | 7.1141 |
| 72.0 | 0.3981 | 91.0 | 5.3348 |
| 73.0 | 0.2511 | 92.0 | 4.0005 |
| 74.0 | 0.1584 | 93.0 | 3.0000 |
| 75.0 | 0.1000 | 94.0 | 2.2496 |
| 76.0 | 0.0630 | 95.0 | 1.6870 |
| 77.0 | 0.0398 | 96.0 | 1.2650 |
| 78.0 | 0.0251 | 97.0 | 0.9486 |
| 79.0 | 0.0158 | 98.0 | 0.7114 |
| 80.0 | 0.0100 | 99.0 | 0.5334 |
| 81.0 | 0.0063 | 100.0 | 0.4000 |
| 82.0 | 0.0039 | | |
| 83.0 | 0.0025 | | |
| 84.0 | 0.0015 | | |
| 85.0 | 0.0010 | | |
| 86.0 | 0.0006 | | |
| 87.0 | 0.0003 | | |
| 88.0 | 0.0002 | | |
| 89.0 | 0.0001 | | |
| 90.0 | 0.0001 | | |

F (reference temp.) value (lethal time by heating): The heating time (minutes, necessary for decreasing cell number from No to N upon heating at the reference temperature.

Z value: Temperature variation corresponding to 10 times or 1/10 time of D value (applied to measured value of bacteria to be sterilized). In general, at 10° C., 18° F.).

D value: Time (minutes) necessary for decreasing the number of living microorganisms to 1/10 upon heating at a constant temperature.

Reference Temperature:

Highly acidic food . . . 65° C. (149° F.)

Acidic food . . . 85° C. (185° F.)

Lowly acidic food . . . 121.1° C. (250° F.)

F. value:

Reference temperature: 121.1° C.

Z=F value at 10° C.

In the following examples and comparative examples, heat resistance and hot water resistance (resistance to whitening) were evaluated by immersing each 100 cc container in a hot water bath at 87° C. for 20 minutes of at 89° C. for. 12 minutes and container volume change and whitened degree by crystallization were evaluated, as a means for evaluating heat resistance and hot water resistance (resistance to whitening) cup-shaped molded articles to heating at 85° C. for 30 minutes (cold spot) which is the heating sterilization conditions of foods having a pH of 4.0 to 4.6 and a water activity (Aw) of less than 0.94 and heating at 65° C. for 10 minutes (cold spot) which is the heating sterilization conditions for foods having a pH of less than 4.0 and a water activity (Aw) of less than 0.94. Evaluations were carried out as follows:

Heat Resistance:

○ . . . Volume change is less than 2%.

Δ . . . Volume change is 2 to 3%.

X ... Volume change more than 3%.

Hot Water Resistance (Resistance to Whitening):

○ ... Not whitened

△ ... Slightly whitened

X ... Completely whitened evaluated by visual observation.

Heat Sealing:

Each cap-shaped molded article prepared in examples and comparative examples was heat-sealed with an aluminum closure containing a polyester adhesive layer as the innermost layer at 190° C. at a load of 20 kg/cm² for one second. The heat seal strength was measured by pulling at 180 degrees, and 1,200 to 2,200 g/15 mm width was evaluated good (○) and less than 1,200 g/15 mm width was evaluated inferior (X)

Recycling Ability:

Each ester copolymer resin pellets produced in examples and comparative examples were mixed with PET resin at a blending ratio of 1/1. The blend pellets were kneaded in a melted state using a 20φ single shaft extruder at a rotating speed of 20 rpm, at 260° C. at the feeding part, at 270° C. at the compression part, at 280° C. at the strand die part, and extruded into strands. The strands were evaluated by visual observation, a not whitened was good (○) and whitened was inferior (X).

Impact Resistance at Cold Temperature:

To each cup-shaped container (80 mm φ, 27 mm in depth, 0.3 mm in thickness), 95 g of Japanese sake at 4° C. was put in the container, and sealed. After keeping the container at 0° C., the conatiner was dropped from 100 cm height to concrete floor twice so that the bottom portion was struck. Not cracked nor leaked was evaluated good (○).

Gas Barrier:

Using a gas permeability measuring apparatus ("Gas Permeability Tester GPM-250, G.L. Science), gas barrier ability of each polymer alloy sheet was measured. Measuring gas used was pure oxygen, and permeated oxygen at 23° C. under ordinary pressure was determined by gas chromatography, and oxygen gas permeability coefficient of less than $2.0 \times 10^{11}$(cm³·cm/cm²·sec·cmHg), i.e. less than 4 times as much as that of PET resin was evaluated good (○), and that of $2.0 \times 10^{11}$ or more was evaluated inferior (X).

Transparency:

Using a direct reading haze meter (Toyo Seiki Seisaku-Sho), the haze value of each sheet 500 μm in thickness was measured according to JIS K-6714, 6717.

$$\text{Haze Value (\%)} = \frac{\text{Diffuied Transmission Rate}}{\text{Whole Rays transmission Rate}} \times 100$$

The haze value of less than 5% was evaluated very good (◎), 5 to 20% was good (○), and more than 20% was infereior (X).

UV shielding:

Using a spectrophotometer (UVEST, Nippon Bunko), light of 200 to 900 nm was irradiated to each sheet 500 μm in thickness and transmitance of ultraviolet rays of 280 to 350 nm was determined. The transmitance of less than 1% was evaluated good (603) and 1% or more was infereior (X).

Example 1

Dicarboxylic acid components consisting of 30 mol. % of 2,6-dimethylnaphthalate (A) and 70 mol. % of dimethylterephthalate (B), glycol components consisting of 90 mol. % of ethylene glycol (C) and 10 mol. % of 1,4-cyclohexyanedimethanol (D) having a cis/trans ratio of 0/100, 0.02 mol. % of titanium tetrabutoxy monomer and 0.02 mol. % of manganese acetate were placed in a reaction vessel, and ester. interchange reaction was conducted by heating up to 180° to 240° C. until distillates did not effuse to obtain low polymer. Subsequently, 0.04 mol. % of trimethyl phosphate and then 0.02 mol. % of antiomony trioxide were added to the reaction vessel, and temperature was elevated from 240° C. to 290° C., and evacuated to 1 torr to make a high vacuum state. Condensation polymerization was conducted with keeping the above temperature and pressure to produce a polymer material having an intrinsic viscosity (I. V.) of 0.60 and a glass transition temperature (Tg) of 107° C. The dicarboxylic acid components ratio (A/B) and the alcohol components ratio (C/D) of the obtained polymer was confirmed to be 50/50 and 30/70 respectively by 'H-NMR using isotope labeled trifluoroacetic acid as the measuring solvent and gas chromatography under ordinary pressure of an alkali hydrolyzate of the polymer hydrolyzed up to monomers. Evaluated results are shown in Table 2.

Undried ester copolymer resin flakes thus produced were extruded by a twin screw extruder rotating in the same direction (2 vents, L/D=37, φ65 mm screw, 1,200 mm T die, lip 2.0 mm) at 290° C. at 200 kg/hr into a sheet 1,000 mm in width 0.6 mm in thickness. The cooling apparatus was a touch roll at 80° C. and a cast roll at 80° C. at a linear pressure of 30 kg/cm. Before winding, silicone was coated to one or both faces of the sheet by a reverse roll coater, the sheet was thon passed a dryer for several seconds and wound by a rewinder.

The above sheet slit into 560 mm in width was attached to an unwinder of a simultaneous punching air-pressure forming machine, and cup-shaped molded articles 80 mm in diameter, 27 mm in depth were molded using a mold capable of molding 6 articles per once in series. The molding conditions were a plug assist temperature of 130° C., an air pressure of 6 kg/cm², a cavity temperature of 20° C., a sheet surface temperature of 135° C., and a molding cycle of 2 to 5 seconds. Contents were charged at 87° C. into each molded article, and an aluminum closure for PET resin having a layer construction of Op (over print) varnish layer 50 μm in thickness/Al layer/polyester adhesive layer 7 g/m² or Melinex 850 (ICI Ltd.) 850 in a low temperature type was attached by heat sealing at 190° C. at 20 kg/cm² for 1 second. The heat seal strength was 2,000 g/15 mm width as a peeling resistance of the closure in the direction at 180 degrees. The space rate of the cup-shaped molded article after heat sealing was 0%. The molded article was transferred to a heating sterilization process, and heated by a hot water shower at 87° C. or by dipping in hot water at 87° C., for 20 minutes. Then, the molded article was cooled by cooling water to 40° C., and water drops were blown off by air to complete the article for market. The heat seal strength after the heating sterization was 1,500 g/15 mm width as a peeling resistance of the closure in the direction at 180 degrees which is suitable for easy peelability. Whitening of the container did not occur by the heating sterilization, and the container had a sufficient heat resistance and hot water resistance (resistance to whitening).

Figure 2:
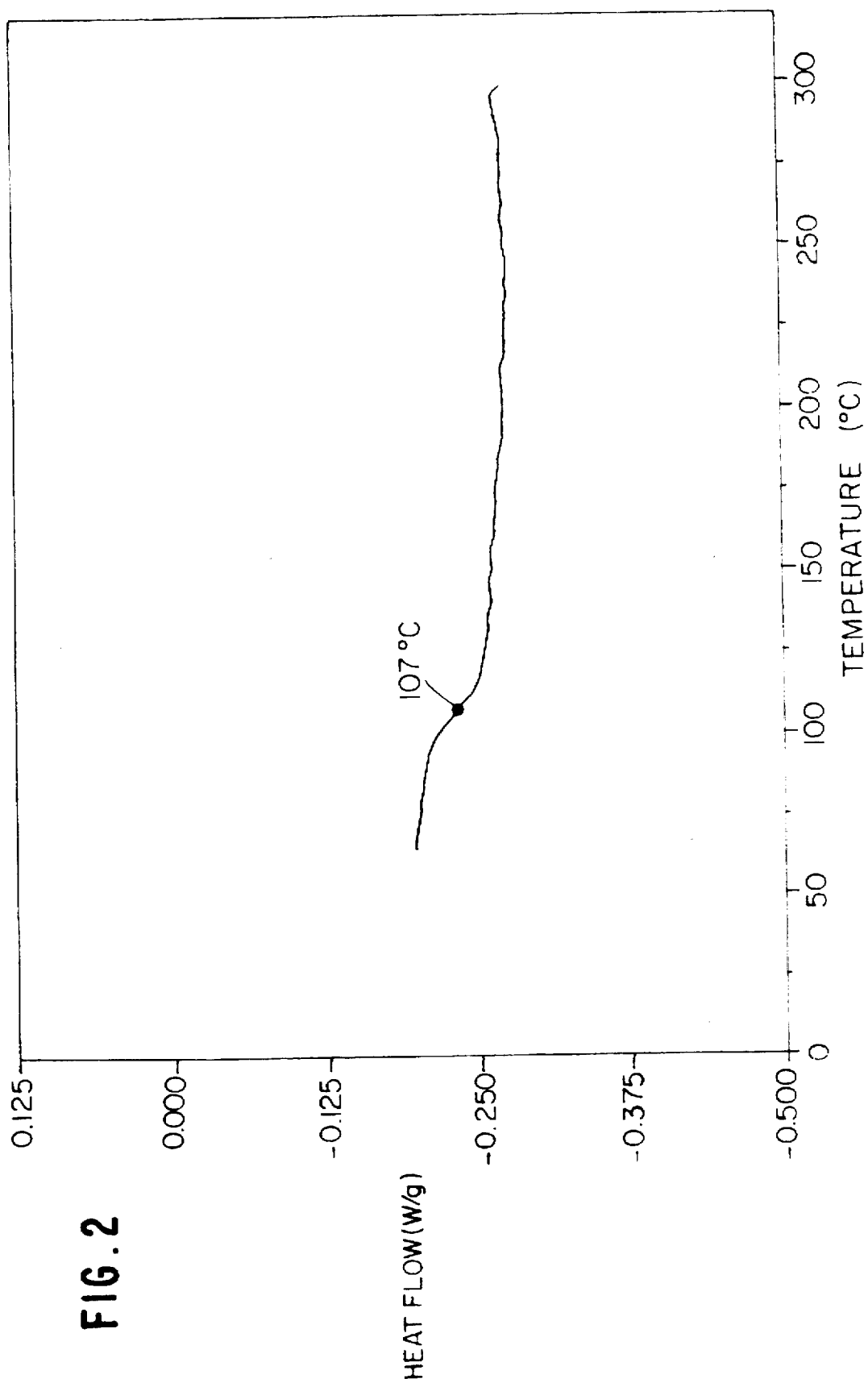
FIG. 2 is a DSC curve of the ester copolymer resin produced in Example 1.

The cup-shaped molded article was evaluated as to heat resistance, hot water resistance (resistance to whitening), heat sealability and recycling ability, and the results are shown in table 2. Infrared absorption spectra of the ester copolymer resin having the following absorptions is shown in FIG. 1, and the results of thermal analysis are shown in FIG. 2.

about 1720 cm⁻¹ stretching vibration of ester group c=o about 1470 cm$^{-1}$ stretching vibration of naphthalene ring c=c about 1180–1260 cm$^{-1}$ in plane deformation vibration of H of naphthalene ring about 760 cm$^{-1}$ in plane deformation vibration of $CH_2$ of methylene chain

Examples 2–9

The molar ratio (A/B) of the dicarbosylic acid components of 2,6-dimethylnaphthalate (A) to dimethylterephthalate (B) was 30/70, and the molor ratio (C/D) of the glycol components of ethylene glycol (C) to 1,4-cyclohexandimethanol (D) was varied to 10/90, 55/45, 94/6, and the cis/trans ratio of 1,4-cyclohexandimethanol was varied to 0/100, 20/80, 40/16 respectively as shown in Table 2. The other conditions were the same as Example 1, and ester copolymers and cup-shaped molded articles were produced. The evaluated results are summarized in Table 2.

Examples 10–18

The molar ratio (A/B) of the dicarboxylic acid components of 2,6-dimethylnaphthalate (A) to dimethylterephthalate (B) was 65/45, and the molor ratio (C/D) of the glycol components of ethylene glycol (C) to 1,4-cyclohexandimethanol (D) was varied to 10/90, 55/45, 94/6, and the cis/trans ratio of 1,4-cyclohexandimethanol was varied to 0/100, 20/80, 40/60, respectively as shown in Table 2. The other conditions were the same as Example 1, and ester copolymers and cup-shaped molded articles were produced. The evaluated results are summarized in Table 2.

Examples 19–27

The molar ratio (A/B) of the dicarbosylic acid components of 2,6-dimethylnaphthalate (A) to dimethylterephthalate (B) was 98/2, and the molor ratio (C/D) of the glycol components of ethylene glycol (C) to 1,4-cyclohexandimethanol (D) was varied to 10/90, 55/45, 94/6, and the cis/trans ratio of 1,4- cyclohexandimethanol was varied to 0/100, 20/80, 40/60, respectively as shown in Table 2. The other conditions were the same as Example 1, and ester copolymers and cup-shaped molded articles were produced. The evaluated results are summarized in Table 2.

Examples 28–33

The molar ratio (A/B) of the dicarbosylic acid components of 2,6-dimethylnaphthalate (A) to dimethylterephthalate (B) was 45/55, and the molor ratio (C/D) of the glycol components of ethylene glycol (C) to 1,4-cyclohexandimethanol (D) was varied to 30/70, 75/25, and the cis/trans ratio of 1,4-cyclohexandimethanol was varied to 0/100, 20/80, 40/60, respectively as shown in Table 2. The other conditions were the same as Example 1, and ester copolymers and cup-shaped molded articles were produced. The evaluated results are summarized in Table 2.

Examples 34–39

The molar ratio (A/B) of the dicarbosylic acid components of 2,6-dimethylnaphthalate (A) to dimethylterephthalate (B) was 80/20, and the molor ratio (C/D) of the glycol components of ethylene glycol (C) to 1,4-cyclohexandimethanol (D) was varied to 30/70, 75/25, and the cis/trans ratio of 1,4-cyclohexandimethanol was varied to 0/100, 20/80, 40/60, respectively as shown in Table 2. The other conditions were the same as Example 1, and ester copolymers and cup-shaped molded articles were produced. The evaluated results are summarized in Table 2.

Example 40

Dicarboxylic acid components consisting of 1952 g of 2,6-dimethylnaphthalate (A) and 1553.5 g of dimethylterephthalate (B), glycol components consisting of 993 g of ethylene glycol (C) and 2304 g of 1,4-cyclohexyanedimethanol (D) having a cis/trans ratio of 20/80 were used. (A), (C) and 0.02 mol. % of manganese acetate were placed in a reaction vessel, and ester interchange reaction was conducted by heating up to 180° to 240° C. until distillates did not effuse to obtain low polymer (E). Similarly, (B), (D) and 0.02 mol. % of titanium tetrabutoxy monomer were placed in a reaction vessel, and ester interchange reaction was conducted by heating up to 180° to 240° C. until distillates did not effuse to obtain low polymer (F). Subsequently, the low polymers (E) and (F) were mixed at a ratio (E)/(F)=30/70, and 0.04 mol. % of trimethyl phosphate and then 0.02 mol. % of antiomony trioxide were added to the reaction vessel, and temperature was elevated from 240° C. to 300° C. and evacuated to 1 mm Hg to make a high vacuum state. Condensation polymerization was conducted with keeping the above temperature and pressure to produce a polymer material having an intrinsic viscosity (I. V.) of 0.60 and a glass transition temperature (Tg). of 112° C. The dicarboxylic acid components ratio (A/B) and the alycol components ratio (C/D) of the obtained polymer was confirmed to be 30/70 and 6/94 respectively by $^1$H-NMR using isotope labeled trifluoroacetic acid as the measuring solvent and gas chromatography under ordinary pressure of an alkali hydrolyzate of the polymer hydrolyzed hydrolyzed up to monomers. The softening point of the polymer was 90° C.

Hereafter conducted similar to Example 1, a cup-shaped molded article was obtained. The heat resistance and, hot water resistance (resistance to whitening) were evaluated, and the results were good (o) and whitening did not occur. These and other evaluated results are shown in Table 2.

Examples 41, 42

The low polymers (E), (F) obtained in Example 40 were mixed at a molar ratio E/F=50/50, 65/35. Hereafter conducted similar to Example 40, ester copolymer resins and cup-shaped molded articles were obtained. The evaluated results are shown in Table 2.

Example 43

Dicarboxylic acid components consisting of 732 g of 2,6-dimethylnaphthalate (A) and 1359.4 g of dimethylterephthalate (B), glycol components consisting of 372 g of ethylene glycol (C) and 2016 g % of 1,4-cyclohexyanedimethanol (D) having a cis/trans ratio of 20/80 were used. (B), (D) and 0.02 mol. % of titanium tetrabutoxy monomar were placed in a reaction vessel, and ester interchange reaction was conducted by heating up to 180° to 240° C. until distillates did not effuse to obtain low polymer (F). (A), (C) and 0.02 mol. % of manganese acetate were added to the reaction vessel, and ester interchange reaction was conducted by heating up to 180° to 240° C. until distillates did not effuse to obtain low polymer (H). Subsequently, the low polymers (E) and (F) were mixed at a ratio (E)/(F)=30/70, and 0.04 mol. % of trimethyl phosphate and then 0.02 mol. % of antiomony trioxide were added to the reaction vessel, and temperature was elevated from 240° C. to 300° C., and evacuated to 1 mm Hg to make a high vacuum state. Condensation polymerization was conducted with keeping the above temperature and pressure to produce a polymer material having an intrinsic viscosity

15

(I. V.) of 0.60 and a glass transition temperature (Tg) of 110° C. The dicarboxylic acid components ratio (A/B) and the alycol components ratio (C/D) of the obtained polymer was confirmed to be 30/70 and 6/94 respectively by 'H-NMR using isotope labeled trifluoroacetic acid as the measuring solvent and gas chromatography under ordinary pressure of an alkali hydrolyzate of the polymer hydrolyzed hydrolyzed up to monomers. The softening point of the polymer was 89° C.

Hereafter conducted similar to Example 1, a cup-shaped molded article was obtained. The heat resistance and, hot water resistance (resistance to whitening) were evaluated, and the results were good (o) and whitening did not occur. These and other evaluated results are shown in Table 2.

Example 44

Dicarboxylic acid components consisting of 1220 g of 2,6-dimethylnaphthalate (A) and 971 g of dimethylterephthalate (B), glycol components consisting of 621 g of ethylene glycol (C) and 1440 g of 1,4-cyclohexyanedimethanol (D) having a cis/trans ratio of 20/80 were used.

Hereafter conducted similar to Example 43, an ester copolymer reisn and a cup-shaped molded article were obtained. The heat resistance and, hot water resistance (resistance to whitening) were evaluated, and the results were good (o) and whitening did not occur. These and other evaluated results are shown in Table 2.

Example 45

Dicarboxylic acid components consisting of 1586 g of 2,6-dimethylnaphthalate (A) and 680 g of dimethylterephthalate (B), glycol components consisting of 807 g of ethylene glycol (C) and 1008 g of 1,4-cyclohexyanedimethanol (D) having a cis/trans ratio of 20/80 were used.

Hereafter conducted similar to Example 43, an ester copolymer reisn and a cup-shaped molded article were obtained. The heat resistance and, hot water resistance (resistance to whitening) were evaluated, and the results were good (o) and whitening did not occur. These and other evaluated results are shown in Table 2.

Example 46

Dicarboxylic acid components consisting of 1952 g of 2,6-dimethylnaphthalate (A) and 1553.5 g of dimethylterephthalate (B), glycol components consisting of 993 g of ethylene glycol (C) and 2304 g of 1,4-cyclohexyanedimethanol (D) having a cis/trans ratio of 20/80 were used. (A), (C) and 0.02 mol. of manganese acetate were placed in a reaction vessel, and ester interchange reaction was conducted by beating up to 180° to 270° C. until distillates did not effuse to obtain low polymer (E). Similarly, (B), (D) and 0.02 mol. % of titanium tetrabutoxy monomer were placed in a reaction vessel, and ester interchange reaction was conducted by heating up to 180° to 270° C. until distillates did not effuse to obtain low polymer (F). Similarly, (A), (D) and 0.02 mol. of titanium tetrabutory monomer were placed in a reaction vessel, and ester interchange reaction was conducted by heating up to 180° to 270° C. until distillates did not effuse to obtain low polymer (G). Subsequently, the low polymers (E), (F) and (G) were mixed at a molar ratio (E)/(F)/(G) of 40/50/60, and 0.04 mol. % of trimethyl phosphate and then 0.02 mol. % of antiomony trioxide were added to the reaction vessel, and temperature was elevated from up to 270° C. to 310° C.

Hereafter conducted similar to Example 40, an ester copolymer reisn and a cup-shaped molded article were obtained. The evaluated results are shown in Table 2.

Reference Examples 1–12

The molar ratio (A/B) of the dicarboxylic acid components of 2,6-dimethylnaphthalate (A) to dimethylterephthalate (B), and the molor ratio (C/D) of the glycol components of ethylene glycol (C) to 1,4-cyclohexandimethanol (D) and the cis/trans ratio of 1,4-cyclohexandimethanol were varied as shown in Table 2. The other conditions were the same as Example 1, and ester copolymers and cup-shaped molded articles were produced. The evaluated results are summarized in Table 2. As a result, when one of respective components were out of the scope, all of four properties could not be satisfied.

TABLE 2

| Example | Copolymer Composition NDC/TPA | Copolymer Composition CHDM/EG | 1,4-CHDM cis/trans | Properties of Molded Article Heat Resistance | Properties of Molded Article Hot Water Resistance | Properties of Molded Article Recycling Ability | Properties of Molded Article Heat Sealability | Softening Point |
|---|---|---|---|---|---|---|---|---|
| Example 1 | 30/70 | 10/90 | 0/100 | o | o | o | o | 85.0 |
| Example 2 | 30/70 | 10/90 | 20/80 | o | o | o | o | |
| Example 3 | 30/70 | 10/90 | 40/60 | o | o | o | o | |
| Example 4 | 30/70 | 55/45 | 0/100 | o | o | o | o | 86.0 |
| Example 5 | 30/70 | 55/45 | 20/80 | o | o | o | o | |
| Example 6 | 30/70 | 55/45 | 40/60 | o | o | o | o | |
| Example 7 | 30/70 | 94/6 | 0/100 | o | o | o | o | 88.0 |
| Example 8 | 30/70 | 94/6 | 20/80 | o | o | o | o | |
| Example 9 | 30/70 | 94/6 | 40/60 | o | o | o | o | |
| Example 10 | 65/35 | 10/90 | 0/100 | o | o | o | o | 88.0 |
| Example 11 | 65/35 | 10/90 | 20/80 | o | o | o | o | |
| Example 12 | 65/35 | 10/90 | 40/60 | o | o | o | o | |
| Example 13 | 65/35 | 55/45 | 0/100 | o | o | o | o | 89.0 |
| Example 14 | 65/35 | 55/45 | 20/80 | o | o | o | o | |
| Example 15 | 65/35 | 55/45 | 40/60 | o | o | o | o | |
| Example 16 | 65/35 | 94/6 | 0/100 | o | o | o | o | 90.0 |
| Example 17 | 65/35 | 94/6 | 20/80 | o | o | o | o | |
| Example 18 | 65/35 | 94/6 | 40/60 | o | o | o | o | |
| Example 19 | 98/2 | 10/90 | 0/100 | o | o | o | o | 92.0 |
| Example 20 | 98/2 | 10/90 | 20/80 | o | o | o | o | |

TABLE 2-continued

| Example | Copolymer Composition | | 1,4-CHDM cis/trans | Properties of Molded Article | | | | |
| --- | --- | --- | --- | --- | --- | --- | --- | --- |
| | NDC/TPA | CHDM/EG | | Heat Resistance | Hot Water Resistance | Recycling Ability | Heat Sealability | Softening Point |
| Example 21 | 98/2 | 10/90 | 40/60 | o | o | o | o | |
| Example 22 | 98/2 | 55/45 | 0/100 | o | o | o | o | 95.0 |
| Example 23 | 98/2 | 55/45 | 20/80 | o | o | o | o | |
| Example 24 | 98/2 | 55/45 | 40/60 | o | o | o | o | |
| Example 25 | 98/2 | 94/6 | 0/100 | o | o | o | o | 97.0 |
| Example 26 | 98/2 | 94/6 | 20/80 | o | o | o | o | |
| Example 27 | 98/2 | 94/6 | 40/60 | o | o | o | o | |
| Example 28 | 45/55 | 30/70 | 0/100 | o | o | o | o | 88.0 |
| Example 29 | 45/55 | 30/70 | 20/80 | o | o | o | o | |
| Example 30 | 45/55 | 30/70 | 40/60 | o | o | o | o | |
| Example 31 | 45/55 | 75/25 | 0/100 | o | o | o | o | 89.0 |
| Example 32 | 45/55 | 75/25 | 20/80 | o | o | o | o | |
| Example 33 | 45/55 | 75/25 | 40/60 | o | o | o | o | |
| Example 34 | 80/20 | 30/70 | 0/100 | o | o | o | o | 91.0 |
| Example 35 | 80/20 | 30/70 | 20/80 | o | o | o | o | |
| Example 36 | 80/20 | 30/70 | 40/60 | o | o | o | o | |
| Example 37 | 80/20 | 75/25 | 0/100 | o | o | o | o | 92.0 |
| Example 38 | 80/20 | 75/25 | 20/80 | o | o | o | o | |
| Example 39 | 80/20 | 75/25 | 40/60 | o | o | o | o | 90.0 |
| Example 40 | 30/70 | 94/6 | 20/80 | o | o | o | o | 93.0 |
| Example 41 | 50/50 | 85/15 | 20/80 | o | o | o | o | 94.0 |
| Example 42 | 65/35 | 55/45 | 20/80 | o | o | o | o | 89.0 |
| Example 43 | 30/70 | 94/6 | 20/80 | o | o | o | o | 92.0 |
| Example 44 | 50/50 | 85/15 | 20/80 | o | o | o | o | 93.0 |
| Example 45 | 65/35 | 55/45 | 20/80 | o | o | o | o | 92.5 |
| Example 46 | 50/50 | 75/25 | 20/80 | o | o | o | o | |
| Reference 1 | 20/80 | 5/95 | 40/60 | x | o | o | o | |
| Reference 2 | 20/80 | 98/2 | 40/60 | o | x | o | o | |
| Reference 3 | 99/1 | 5/95 | 40/60 | o | x | x | o | |
| Reference 4 | 99/1 | 98/2 | 40/60 | o | o | x | x | |
| Reference 5 | 60/40 | 5/95 | 40/60 | x | o | o | o | |
| Reference 6 | 60/40 | 98/2 | 40/60 | o | o | o | x | |
| Reference 7 | 20/80 | 55/45 | 40/60 | x | o | o | o | |
| Reference 8 | 99/1 | 55/45 | 40/60 | o | o | x | x | |
| Reference 9 | 30/70 | 10/90 | 50/50 | x | o | o | o | |
| Reference 10 | 30/70 | 94/6 | 50/50 | x | o | o | o | |
| Reference 11 | 98/2 | 10/90 | 50/50 | o | o | x | x | |
| Reference 12 | 98/2 | 94/6 | 50/50 | o | o | x | x | |

NDC: Naphthalene dicarboxylic acid
TPA: Terephthalic acid
1,4-CHDM: 1,4-cyclohexanedimethanol
EG: Ethylene glycol Comparative Examples 1

A polyethylene terephthalate (PET) sheet and a cup-shaped molded article were evaluated similar to Example 1, and the results are shown in Table 3. As a result, both of heat resistance and hot water resistance (resistance to whitening) were inferior.

Comparative Examples 2

A polyethylene naphthalate (PEN) sheet and a cup-shaped molded article were evaluated similar to Example 1, and the results are shown in Table 3. Although heat resistance and hot water resistance (resistance to whitening) were good, heat sealability and recycling ability were inferior.

Comparative Examples 3

Two types of triple layer sheets 0.6 mm in thickness using polyethylene terephthalate and polyacrylate and cup-shaped molded articles thereof were evaluated similar to Example 1, and the results are shown in Table 3. As a result, although heat sealability was good, deformation and whitening occurred.

TABLE 3

Comparison of Conventional Articles

| | Properties of Molded Article | | | |
| --- | --- | --- | --- | --- |
| Example | Heat Resistance | Hot Water Resistance | Recycling Ability | Heat Sealability |
| Comparative 1 PET | X | X | — | O |
| Comparative 2 PEN | O | O | Δ | X |
| Comparative 3 PET/PAR | Δ | X | O | O |

1) Triple layer film of two kind layers of PET and polyacrylate

Example 47

Direct Blow Molding

An ester copolymer resin having an I.V.=0.06 was produced according to the same operation as Example 1, and the copolymer was further polymerized by solid phase polymerization to obtain an ester copolymer having an I.V.=1.02.

In order to make the water content of the manufactured undried ester copolymer resin 50 ppm not more than 50 ppm, the resin was dried by a vacuum dryer at 80° C. for 10 hours. Thereafter, direct blow molding was conducted at a front zone temperature of the barrel of 270° to 280° C., at a middle zone temperature of the barrel of 270 to 280° C., at a rear zone temperature of the barrel of 270° to 280° C., at a nozzle portion temperature of 280° to 300° C., at a mold chiller temperature of 10° to 30° C., at a blowing pressure of 6 to 10 kg/cm$^2$ at a molding cycle time of 7 seconds to produce molded articles of a 300 ml transparent compact bottle.

Contents were charged at 87° C. into each molded article, and sealed by attaching a screw cap made of metal.

The molded article was transferred to a heating sterilization process, and heated by a hot water shower at 87° C. or by dipping in hot water at 87° C., for 20 minutes. Then, the molded article was cooled by cooling water to 40° C. and water drops were blown off by air to complete the article for market. Whitening of the container did not occur by the heating sterilization, and the containg had a sufficient heat resistance and hot water resistance (resistance to whitening).

The bottle-shaped molded article was evaluated as to heat resistance, hot water resistance (resistance to whitening) and recycling ability, and the results are shown in Table 4.

Example 48

Injection Molding

Anjester copolymer resin having an I.V.=0.60 was produced according to the same operation as Example 1.

In order to make the water content of the manufactured undried ester copolymer resin 50 ppm not more than 50 ppm, the resin was dried by at 80° C. for 10 hours. Thereafter, injection molding was conducted at a front zone temperature of the barrel of 270° to 280° C., at a middle zone temperature of the barrel of 270° to 280° C., at a rear zone temperature of the barrel of 270° to 280° C., at a nozzle portion zone temperature of the hot runner of 280° to 300° C., a charging pressure of 100 kg/cm$^2$, a rotation speed of 50 rpm, a charging time of 3 seconds, a holding pressure of 35 kg/cm$^2$, at a mold chiller temperature of 10° to 30° C., at a molding cycle time of 15 to 20 seconds to produce cup-shaped molded articles.

Contents were charged at 87° C. into each molded article, and sealed by attaching a screw cap made of metal.

Contents were charged at 87° C. into each molded article, and an aluminum closure for PET resin having a layer construction of Op (over print) varnish layer 50 μm in thickness/Al layer/polyester adhesive layer 7 g/m$^2$ was attached by heat sealing at 190° C. at 20 kg/cm$^2$ for 1 second. The heat seal strength was 1,800 g/15 mm width as a peeling resistance of the closure in the direction at 180 degrees. The space rate of the cup-shaped molded article after heat sealing was 0%. The molded article was transferred to a heating sterilization process, and heated by a hot water shower at 87° C. or by dipping in hot water at 87° C., for 20 minutes. Then, the molded article was colled by cooling water to 40° C., and water drops were blown off by air to complete the article for market. The heat seal strength after the heating sterization was 1,485 g/15 mm width as a peeling resistance of the closure in the direction at 180 degrees which is suitable for easy peelability. Whitening of the container did not occur by the heating sterilization, and the container had a sufficient heat resistance and hot water resistance (resistance to whitening).

The cup-shaped molded article was evaluated as to heat resistance, hot water resistance (resistance to whitening), heat sealability and recycling ability, and the results are shown in table 4.

Example 49

Injection blow Molding with Biaxial Stretching (Hot Parison)

Anjester copolymer resin having an I.V.=0.60 was produced according to the same operation as Example 1.

In order to make the water content of the manufactured undried ester copolymer resin 50 ppm not more than 50 ppm, the resin was dried by at 80° C. for 10 hours. Thereafter, a parison was molded by injection molding at a front zone temperature of the barrel of 270° to 280° C., at a middle zone temperature of the barrel of 270° to 280° C., at a rear zone temperature of the barrel of 270° to 280° C., at a nozzle portion zone temperature of the hot runner of 280° to 300° C. The parison was cooled to 70 to 90 A, and then transferred to a temperature control process. In the temperature control process, the parison was heated up to 130° to 150° C. and transferred to a blowing process. In the blowing process, blow molding with biaxial stretching was conducted at a blowing pressure of 25 kg/cm$^2$, at a mold chiller temperature of 10° to 30° C., at a molding cycle time of 15 seconds to produce molded articles of a 500 ml transparent bottle.

Contents were charged at 87° C. into each molded article, and sealed by attaching a screw cap made of metal.

The molded article was transferred to a heating sterilization process, and heated by a hot water shower at 87° C. or by dipping in hot water at 87° C., for 20 minutes. Then, the molded article was colled by cooling water to 40° C., and water drops were blown off by air to complete the article for market. Whitening of the container did not occur by the heating sterilization, and the container had a sufficient heat resistance and hot water resistance (resistance to whitening).

The bottle-shaped molded article was evaluated as to heat resistance, hot water resistance (resistance to whitening), and recycling ability, and the results are shown in Table 4.

Example 50

Injection Blow Molding with Biaxial Stretching (Cold Parison)

Anjester copolymer resin having an I.V.=0.60 was produced according to the same operation as Example 1.

In order to make the water content of the manufactured undried ester copolymer resin 50 ppm not more than 50 ppm, the resin was dried by at 80° C. for 10 hours. Thereafter, a preform was molded by injection molding at a front zone temperature of the barrel of 270° to 280° C., at a middle zone temperature of the barrel of 270° to 280° C., at a rear zone temperature of the barrel of 270° to 280° C., at a nozzle portion zone temperature of the hot runner of 280° to 300° C., at a charging pressure of 100 kg/cm$^2$, at a rotation speed of 50 rpm, at a charging time of 4 seconds, at a holding pressure of 35 kg/cm$^2$, at a mold chiller temperature of 10° to 30° C., at a molding cycle time of 23–28 seconds to produce 16 preforms per one molding.

The preform was subjected to blow molding with biaxial stretching in a separate process using a biaxial stretching blow molding machine by heating up to 130° to 150° C. by a near infrared heater and the blow-molding in a blowing mold using a stretching rod and compresed air at 40 kg/cm$^2$ or more to produce molded articles of a 500 ml transparent stretched bottle.

Contents were charged at 87° C. into each molded article, and sealed by attaching a screw cap made of metal.

The molded article was transferred to a heating sterilization process, and heated by a hot water shower at 87° C. or by dipping in hot water at 87° C., for 20 minutes. Then, the molded article was colled by cooling water to 40° C., and water drops were blown off by air to complete the article for market. Whitening of the container did not occur by the heating sterilization, and the container had a sufficient heat resistance and hot water resistance (resistance to whitening).

The bottle-shaped molded article was evaluated as to heat resistance, hot water resistance (resistance to whitening), and recycling ability, and the results are shown in Table 4.

conditions were a plug temperature of 140° C., an air pressure of 6 kg/cm², a cavity temperature of 20° C., a sheet surface temperature of 150° C., and a molding cycle of 2 to 5 seconds.

Various properties of the cup-shaped molded article were evaluated, and are shown in Table 5. It was confirmed that the cup-shaped molded article had a sufficient heat resistance (A), hot water resistance (resistance to whitening) (B), dropping strength at a cold temperature (C), gas barrier (D),

TABLE 4

| | Copolymer | | | | Properties of Molded Article | | | |
| --- | --- | --- | --- | --- | --- | --- | --- | --- |
| | Composition | | 1,4-CHDM | | Heat | | Recycling | Heat |
| | NDC/TPA | CHDM/EG | cis/tran | Molding | Resistance | Hot Water | Ability | Sealability |
| Example 47 | 30/70 | 10/90 | 0/100 | Direct Blow Molding | ○ | ○ | ○ | — |
| Example 48 | 30/70 | 10/90 | 0/100 | Injection Molding | ○ | ○ | ○ | ○ |
| Example 49 | 30/70 | 10/90 | 0/100 | Injection Biaxial Stretching Blow Holding (Hot Parison) | ○ | ○ | ○ | — |
| Example 50 | 30/70 | 10/90 | 0/100 | Injection Biaxial Stretching Blow Holding (Cold Parison) | ○ | ○ | ○ | — |

Example 51

Dicarboxylic acid components consisting of 5 mol. % of 2,6-dimethylnaphthalate (A) and 95 mol. % of dimethylterephthalate (B), glycol components consisting of 47 mol. % of ethylene glycol (C) and 53 mol. % of 1,4-cyclohexyanedimethanol (D) having a cis/trans ratio of 0/100, 0.02 mol. % of titanium tetrabutoxy monomer and 0.02 mol. % of manganese oxide were placed in a reaction vessel, and ester interchange reaction was conducted by heating up to 180° to 240° C. until distillates did not effuse to obtain low polymer. Subsequently, 0.04 mol. % of trimethyl phosphate and then 0.02 mol. %. of antiomony trioxide were added to the reaction vessel, and temperature was elevated from 240° C. to 290° C., and evacuated to 1 torr to make a high vacuum state. Condensation polymerization was conducted with keeping the above temperature and pressure to produce a polymer material having an intrinsic viscosity (I.V.) of 0.60. The dicarboxylic acid components ratio (A/B) and the alycol components ratio (C/D) of the obtained polymer was confirmed to be 5/95 and 47/53 respectively by 'H-NMR using isotope labeled trifluoroacetic acid as the measuring solvent and gas chromatography under ordinary pressure of an alkali hydrolyzate of the polymer hydrolyzed up to monomers. Evaluated results are shown in Table 5.

The above ester copolymer resin was formed into pellets having a prescribed form and size, and then dried. The pellets were mixed with pellets of polycarbonate resin having an average molecular weight of 23,000 to 25,000 ("YUBILON S-2000", Mitsubishi Gas Chemical) at a mixing ratio by weight of 70/30, and the pellet mixture was extruded by a twin screw extruder rotating in the same direction at 290° C. into a sheet 0.6 mm in thickness. The sheet was formed into cut-shaped molded articles 80 mm in diameter, 27 mm in depth, 0.3 mm in thickness by an air-pressure forming machine. The air-pressure forming heat sealability (E), trunsparency (F) and UV shielding ability (UV) as a container for goods.

Examples 52–85, Comparative Example 4–22

The molar ratio (A/B) of the dicarboxylic acid components of 2,6-dimethylnaphthalate (A) to dimethylterephthalate (B) the molor ratio (C/D) of the glycol components of ethylene glycol (C) to 1,4-cyclohexandimethanol (D) and the cis/trans ratio of 1,4-cyclohexandimethanol were varied, respectively as shown in Table 5. The other conditions were the same as Example 51, and ester copolymers were produced.

As to the ester copolymer resins and polymer alloys of Examples 52 to 63, 67 to 85 and Comparative Examples 4 to 22, cup-shaped molded articles were molded and evaluated similar to Example 51, and the results are summarized in Table 5.

As shown in Table 5, cup-shaped molded articles of Examples 52–63, 67–79 had a sufficient heat resistance, hot water resistance dropping strength at a cold temperature, gas barrieir, heat sealability, transparency and UV shielding ability as a container for goods. The molded articles having a molar ratio of naphthalene dicarboxylic acid of not more than 70 mol. % and a molar ratio of ethylene glycol of not more than 25 mol. % were excellent in transparency having a haze value of less than 5%. It can be seen from Comparative Example 5, 6, 9–11 and 14 that, when the solubility parameter (d ) exceeds 11.9, transparency is degraded, from Comparative Example 7 that when the solubility parameter is less than 10.8, UV shielding and gas barrier are degraded. Furthermore, in the Examples satisfying that the blending ratio of the ester copolymer resin/polycarbonate resin is 2/98 to 95/5 and the ester copolymer resin has a molar ratio (A/B) of 2,6-naphthalene group of 5 to 95 mol. %, a molar ratio (C/D) of ethylene group of 5 to 47 mol. % and a cis/trans ratio of 1,4-cyclohexylene group of 0/100 to 40/60, heat resistance, hot water resistance, transparency and UV shielding were sufficient for a container for goods. In the Examples further satisfying that the blending ratio of the ester copolymer resin/polycarbonate resin is 50/50 to 80/20, all of heat resistance through UV shielding were excellent.

As to the ester copolymer resins and polymer alloys of Examples 64–66, cup-shaped molded articles were molded with varing the blending ratio of the ester copolymer reisn to polycarbonate resin and then evaluated similar to Example 51. The results are summarized in Table 5.

It was confirmed that the cup -shaped molded article had a sufficient heat resistance (A), hot water eistance (resistance to whitening) (B), dropping strength at a cold temperature (C), gas barrier (D), heat sealability (E) transparency (F) and UV shielding ability (UV) as a container for goods. As to the ester copolymer resin and polymer alloy of Example 80, a sheet 0.6 mm in thickness was molded using a polymer alloy having a blending ratio (ester copolymer resin/polycarbonate resin w/w) of 30/70 in a manner similar to Example 51. The oxygen gas barrier of the sheet was measured, and found to be $3.4 \times 10^{-11}$ cm$^3$·cm/cm$^2$·sec·cm Hg. On the other hand, the oxygen gas barrier of a conventional PET sheet was $5.8 \times 10^{-12}$ cm$^3$·cm/cm$^2$·sec·cm Hg. Accordingly the above sheet was insufficient in gas barrier, and could not be used for even for a food having a short relishable period of about 3 months. However, the other properties, such as heat resistance, were sufficient. The results are shown in Table 5. As to ester copolymer resin and polymer alloy of Example 81, a sheet 0.6 mm in thickness was molded using a polymer alloy having a blending ratio (ester copolymer resin/polycarbonate resin w/w) of 90/10 in a manner similar to Example 64. The sheet was formed into cup-shaped molded articles 80 mm in diameter and 27 mm in depth, and various properties were measured similar to Example 64. As a result, dropping strength at a cold temperature was insufficient. However, the other properties, such as heat resistance and hot water resistance, were sufficient.

In Table 5, the polymer alloy of Example 80 has a blending ratio (ester copolymer resin/polycarbonate resin w/w) of 30/70 which is out of the scope of 50/50 to 80/20, although in the scope of 2/98 to 95/5. As a result, the molded article was inferior in gas barrier. The polymer alloy of Example 81 has a blending ratio of 90/10 which is out of the scope of 50/50 to 80/20, and was inferior in impact resistance at a cold temperature. The polymer alloy of Example 82 has a blending ratio of 2/98 which is out of the scope of 50/50 to 80/20, and was inferior in gas barrier and heat sealability. The polymer alloy of Example 83 has a blending ratio of 95/5 which is out of the scope of 50/50 to 80/20, and was inferior in impact resistance at a cold temperature. The polymer alloys of Comparative Examples 11 and 13 have a CHDM/EG ratio which is out of the scope of 47/53 to 5/95, respectively, and the former was inferior in transparency and the latter was inferior in gas barrier and heat sealability. The polymer alloys of Comparative Examples 12 and 14 have a NDC/TPA ratio which is out of the scope of 5/95 to 95/5, and the former was inferior in heat resistance and hot water resistance and the latter was inferior in heat sealability and trnasparency. The polymer alloys of Comparative Examples 15 to 22 have a cis/trans ratio out of the scope of 0/100 to 40/60, and heat resistance was inferior.

TABLE 5

| | Ester Copolymer Resin | | | | Alloy Blend Ratio | Properties of Molded Article | | | | | | |
|---|---|---|---|---|---|---|---|---|---|---|---|---|
| | NDC/TPA | CHDM/EG | CHDM cis/trans | δ | | A | B | C | D | E | F | UV |
| Example | | | | | | | | | | | | |
| 51 | 5/95 | 53/47 | 0/100 | 11.38 | 70/30 | o | o | o | o | o | o | o |
| 52 | 5/95 | 53/47 | 24/76 | 11.38 | 70/30 | o | o | o | o | o | o | o |
| 53 | 5/95 | 53/47 | 40/60 | 11.38 | 70/30 | o | o | o | o | o | o | o |
| 54 | 5/95 | 87/13 | 0/100 | 10.96 | 70/30 | o | o | o | o | o | ⊚ | o |
| 55 | 5/95 | 87/13 | 24/76 | 10.96 | 70/30 | o | o | o | o | o | ⊚ | o |
| 56 | 5/95 | 87/13 | 40/60 | 10.96 | 70/30 | o | o | o | o | o | ⊚ | o |
| 57 | 5/95 | 95/5 | 0/100 | 10.87 | 70/30 | o | o | o | o | o | ⊚ | o |
| 58 | 5/95 | 95/5 | 24/76 | 10.87 | 70/30 | o | o | o | o | o | ⊚ | o |
| 59 | 5/95 | 95/5 | 40/60 | 10.87 | 70/30 | o | o | o | o | o | ⊚ | o |
| 60 | 50/50 | 53/47 | 0/100 | 11.60 | 70/30 | o | o | o | o | o | o | o |
| 61 | 50/50 | 53/47 | 24/76 | 11.60 | 70/30 | o | o | o | o | o | o | o |
| 62 | 50/50 | 53/47 | 40/60 | 11.60 | 70/30 | o | o | o | o | o | ⊚ | o |
| 63 | 50/50 | 87/13 | 0/100 | 11.18 | 70/30 | o | o | o | o | o | ⊚ | o |
| 64 | 50/50 | 87/13 | 24/76 | 11.18 | 50/50 | o | o | o | o | o | ⊚ | o |
| 65 | 50/50 | 87/13 | 24/76 | 11.18 | 70/30 | o | o | o | o | o | ⊚ | o |
| 66 | 50/50 | 87/13 | 24/76 | 11.18 | 80/20 | o | o | o | o | o | ⊚ | o |
| 67 | 50/50 | 87/13 | 40/60 | 11.18 | 70/30 | o | o | o | o | o | ⊚ | o |
| 68 | 50/50 | 95/5 | 0/100 | 11.08 | 70/30 | o | o | o | o | o | ⊚ | o |
| 69 | 50/50 | 95/5 | 24/76 | 11.08 | 70/30 | o | o | o | o | o | ⊚ | o |
| 70 | 50/50 | 95/5 | 40/60 | 11.08 | 70/30 | o | o | o | o | o | ⊚ | o |
| 71 | 95/5 | 53/47 | 0/100 | 11.84 | 70/30 | o | o | o | o | o | o | o |
| 72 | 95/5 | 53/47 | 24/76 | 11.84 | 70/30 | o | o | o | o | o | o | o |
| 73 | 95/5 | 53/47 | 40/60 | 11.84 | 70/30 | o | o | o | o | o | o | o |
| 74 | 95/5 | 87/13 | 0/100 | 11.40 | 70/30 | o | o | o | o | o | o | o |
| 75 | 95/5 | 87/13 | 24/76 | 11.40 | 70/30 | o | o | o | o | o | o | o |
| 76 | 95/5 | 87/13 | 40/60 | 11.40 | 70/30 | o | o | o | o | o | o | o |
| 77 | 95/5 | 95/5 | 0/100 | 11.30 | 70/30 | o | o | o | o | o | o | o |
| 78 | 95/5 | 95/5 | 24/76 | 11.30 | 70/30 | o | o | o | o | o | o | o |
| 79 | 95/5 | 95/5 | 40/60 | 11.30 | 70/30 | o | o | o | o | o | o | o |
| 80 | 50/50 | 87/13 | 24/76 | 11.18 | 30/70 | o | o | o | x | o | ⊚ | o |
| 81 | 50/50 | 87/13 | 24/76 | 11.18 | 90/10 | o | o | x | o | o | ⊚ | o |

TABLE 5-continued

| | Ester Copolymer Resin | | | Alloy Blend Ratio | Properties of Molded Article | | | | | | |
|---|---|---|---|---|---|---|---|---|---|---|---|
| | NDC/TPA | CHDM/EG | CHDM cis/trans | δ | | A | B | C | D | E | F | UV |
| 82 | 50/50 | 89/11 | 24/76 | 11.16 | 2/98 | o | o | o | x | x | ⊙ | o |
| 83 | 50/50 | 89/11 | 24/76 | 11.16 | 95/5 | o | o | x | o | o | ⊙ | o |
| 84 | 50/50 | 69/31 | 24/76 | 11.40 | 50/50 | o | o | o | o | o | o | o |
| 85 | 75/25 | 85/15 | 24/76 | 11.32 | 50/50 | o | o | o | o | o | o | o |
| Comparative Example | | | | | | | | | | | | |
| 4 | — | — | — | — | 0/100 | o | o | o | x | x | ⊙ | x |
| 5 | 100/0 | 50/50 | 24/76 | 11.91 | 50/50 | o | o | o | o | x | x | o |
| 6 | 100/0 | 0/100 | — | 12.55 | 50/50 | o | o | o | o | x | x | o |
| 7 | 0/100 | 100/0 | 24/76 | 10.78 | 50/50 | x | x | o | x | o | ⊙ | x |
| 8 | 0/100 | 50/50 | 24/76 | 11.40 | 50/50 | x | x | o | o | o | o | x |
| 9 | 0/100 | 0/100 | — | 12.01 | 50/50 | x | x | o | o | o | x | x |
| 10 | 95/5 | 40/60 | 24/76 | 12.00 | 50/50 | o | o | o | o | o | x | o |
| 11 | 95/5 | 50/50 | 24/76 | 11.93 | 70/30 | o | o | o | o | o | x | o |
| 12 | 2/98 | 87/13 | 24/76 | 10.95 | 70/30 | x | x | o | o | o | ⊙ | x |
| 13 | 50/50 | 98/2 | 24/76 | 11.04 | 70/30 | o | o | o | x | x | ⊙ | o |
| 14 | 98/2 | 53/47 | 24/76 | 11.92 | 70/30 | o | o | o | o | x | x | o |
| 15 | 5/95 | 53/47 | 50/50 | 11.38 | 70/30 | x | o | o | o | o | o | o |
| 16 | 5/95 | 95/53 | 50/50 | 10.87 | 70/30 | x | o | o | o | o | ⊙ | o |
| 17 | 50/50 | 53/47 | 50/50 | 11.60 | 70/30 | x | o | o | o | o | o | o |
| 18 | 50/50 | 95/5 | 50/50 | 11.08 | 70/30 | x | o | o | o | o | ⊙ | o |
| 19 | 95/5 | 95/5 | 50/50 | 11.30 | 70/30 | x | o | o | o | o | o | o |
| 20 | 95/5 | 95/5 | 50/50 | 11.30 | 70/30 | x | o | o | o | o | o | o |
| 21 | 50/50 | 87/13 | 50/50 | 11.18 | 50/50 | x | o | o | o | o | ⊙ | o |
| 22 | 50/50 | 87/13 | 50/50 | 11.18 | 80/20 | x | o | o | o | o | ⊙ | o |

NDC: Naphthalene dicarboxylic acid
TPA: Terephthalic acid
CHDM: Chyclohexanedimethanol
EG: Ethylene glycol
NDC/TPA: Molar ratio (total 100 mol. %)
CMMD/EG:
cis/trans:
Blend Ratio: Ester copolymer resin/Polycarbonate resin (w/w)
A: Heat resistance
B: Hot water resistance
C: Dropping strength at cold temperature
D: Gas barrier
E: Heat sealability
F: Transparency
UV: UV shielding ability Comparative Examples 23–26

Examples 86–88

Using the ester copolymer resin of Example 64 and polycarbonate resin of Example 51, various polymer alloys were prepared by varying the blending ratio (ester copolymer resin/polycarbonate resin), and molded into cup-shaped molded articles which were the aforementioned 100 cc cup-shaped molded articles. The heat resistance of each molded article was investigated by immersing into a thermostatic hot water bath at 87° C. for 30 minutes, and volume change of each molded article was measured. In a comparison, a cup made of the polycarbonate resin alone was also subjected to the heat resistance test. The results are summarized in Table 6.

TABLE 6

| | Blending Ratio (w/w) | Both Temperature (°C.) | Heat Resistance 30 minutes |
|---|---|---|---|
| Comparative 23 | 95/5 | 87 | X |
| Comparative 24 | 95/10 | 87 | △ |
| Comparative 25 | 30/70 | 87 | O |
| Comparative 26 | 0/100 | 87 | O |
| Example 86 | 80/20 | 87 | O |
| Example 87 | 70/30 | 87 | O |
| Example 88 | 50/50 | 87 | O |

As can be seen from Table 6, by resndering the blending ratio (ester copolymer resin/polycarbonate resin) in the range o 50/50 to 80/20, packaging containers having a sufficient heat resistance can be produced.

Example 89

Figure 3:
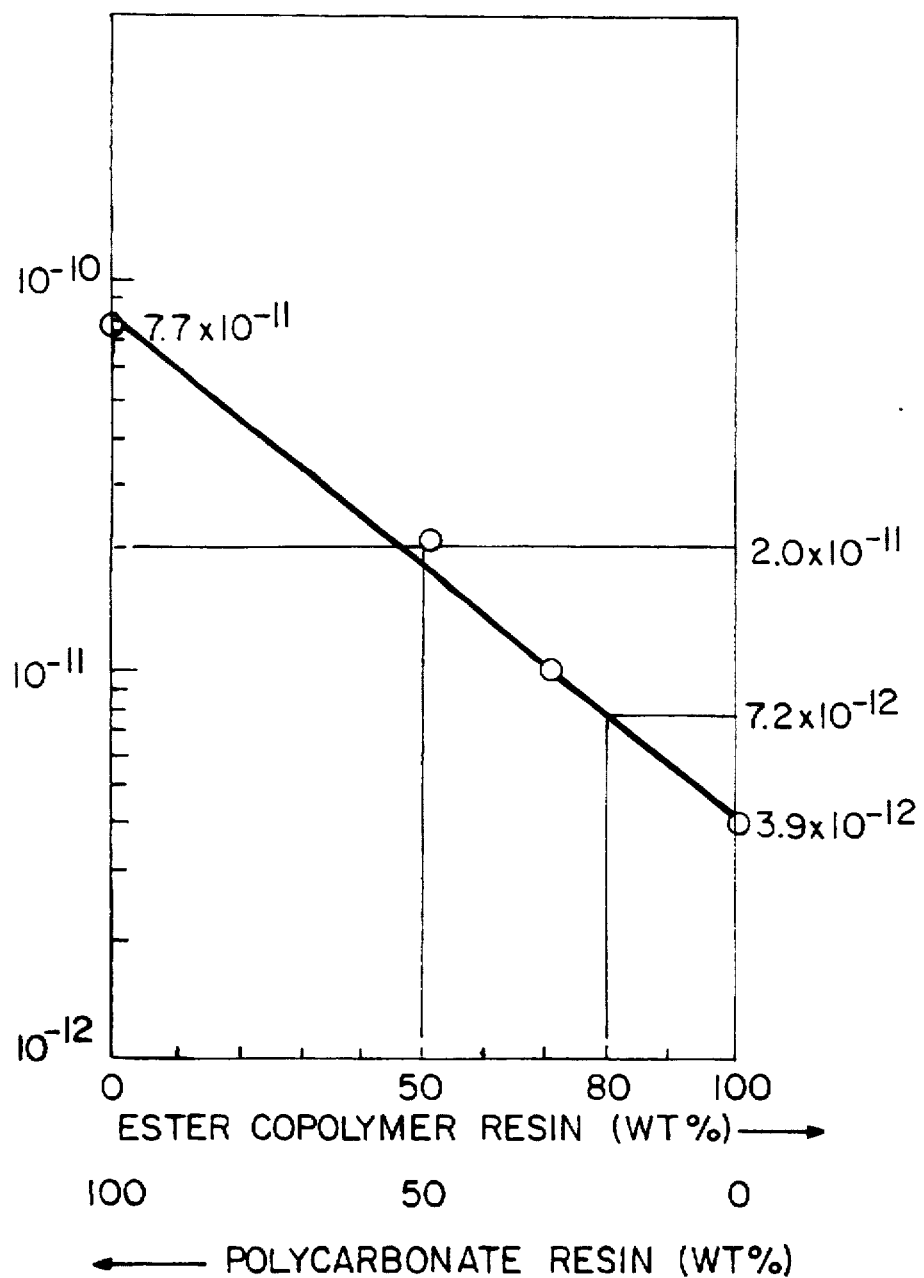
FIG. 3 is a graph indicating a relation between a blending ratio of a ester copolymer resin and a polycarbonate resin and oxygen permeability of a sheet formed of the blended resin.

Using the ester copolymer resin of example 64 and polycarbonate resin of Example 51, various polymer alloys were prepared by varying the blending ratio (ester copolymer resin/polycarbonate resin), and molded into sheets. The gas barrier (oxygen gas permeability) of each sheet was invenstigated. In a comparison, a polycarbonate sheet and a commercial PET sheet were also subjected to the gas barrier test. The result are shown in FIG. 3.

As can be seen from the figure, the oxygen gas permeability decreases in straight with increasing to content of the ester copolymere resin, and the oxygen gas permeability can be made $2.0 \times 10^{-11}$ to $7.2 \times 10^{-12}$ cm²·cm/cm²·sec·cm Hg by rendering the blending ratio of the ester copolymer resin 50 to 80 wt. %. The oxygen gas permeability of the PET sheet was $5.8 \times 10^{-12}$, and accordingly, the oxygen gas permeability of the polymer alloy sheet having a blending ratio of 50 to 80 wt. % is less than 4 times that of PET resin sheet. The oxygen gas permeability of the polycarbonate sheet was $7.7 \times 10^{-11}$.

We claim:

1. An ester copolymer resin having a general formula [I]

HO—(COArCOORO)ₙ—H     [I]

wherein Ar represents a 2,6-naphthalene group or a phenylene group and consists of 30 to 98 mol % of said 2,6-naphthalene group and 70 to 2 mol % of said phenylene group, R represents an ethylene group or a 1,4-cyclohexylene group and consists of 5 to 90 mol % of said ethylene group and 95 to 10 mol % of said 1,4-cyclohexylene group, wherein said 1,4-cyclohexylene group has a cis/trans ratio of 0/100 to 40/60, and n is selected from a range of 100 to 1000.

2. A method of producing a ester copolymer resin having a general formula [I]

HO—(COArCOORO)ₙ—H     [I]

wherein Ar represents a 2,6-naphthalene group or a phenylene group and consists of 30 to 98 mol % of said 2,6-naphthalene group and 70 to 2 mol % of said phenylene group, R represents an ethylene group or a 1,4-cyclohexylene group and consists of 5 to 90 mol % of said ethylene group and 95 to 10 mol % of said 1,4-cyclohexylene group, wherein said 1,4-cyclohexylene group has a cis/trans ratio of 0/100 to 40/60, and n is a number of 100 to 1000;
said method comprising allowing a 2,6-naphthalene dicarboxylic acid lower alkyl ester to react with an ethylene glycol and a terephthalic acid lower alkyl ester to react with a 1,4-cyclohexane dimethanol, respectively, through ester interchange reaction, and then mixing both reaction products to conduct condensation polymerization.

3. A method of producing a ester copolymer resin having a general formula [I]

HO—(COArCOORO)ₙ—H     [I]

wherein Ar represents a 2,6-naphthalene group or a phenylene group and consists of 30 to 98 mol % of said 2,6-naphthalene group and 70 to 2 mol % of said phenylene group, R represents an ethylene group or a 1,4-cyclohexylene group and consists of 5 to 90 mol % of said ethylene group and 95 to 10 mol % of said 1,4-cyclohexylene group, wherein said 1,4-cyclohexylene group has a cis/trans ratio of 0/100 to 40/60, and n is a number of 100 to 1000;
said method comprising reacting a terephthalic acid lower alkyl ester and a 1,4-cyclohexane dimethanol through a first ester interchange reaction to produce a first reaction product, reacting said first reaction product through a second ester interchange reaction with a 2,6-naphthalene dicarboxylic acid lower alkyl ester and an ethylene glycol, to produce a second reaction product and then conducting condensation polymerization of said second reaction product to form said ester copolymer resin.

4. The method of claim 2 wherein the polyester copolymer having an Ar consisting of 30 to 98 mol % of 2,6-naphthalene group and 70 to 2 mol % of phenylene group, an R consisting of 5 to 90 mol % of ethylene group and 95 to 10 mol % of 1,4-cyclohexylene group, and the 1,4-cyclohexylene group having a cis/trans ratio of 0/100 to 40/60.

5. The method of claim 3 wherein the polyester copolymer having an Ar consisting of 30 to 98 mol % of 2,6-naphthalene group and 70 to 2 mol % of phenylene group, an R consisting of 5 to 90 mol % of ethylene group and 95 to 10 mol % of 1,4-cyclohexylene group, and the 1,4-cyclohexylene group having a cis/trans ratio of 0/100 to 40/60.

6. A packaging material formed of a resin composition of which the principal component is the ester copolymer resin of claim 1 or 2.

7. The packaging material of claim 6 wherein the packaging material is a packaging container molded by vacuum molding, pressure forming, direct blow molding, injection molding, injection blow molding or injection blow molding with biaxial stretching.

8. The ester copolymer resin of claim 1 which is random copolymer or block copolymer comprising lower polymers.

9. The ester copolymer resin of claim 1 wherein said lower polymers have a polymerization degree represented by an intrinsic viscosity of 0.2 or less.

10. The ester copolymer resin of claim 1 wherein said Ar consists of 40 to 90 mol % of a 2,6-naphthalene group and 60 to 10 mol % of a phenylene group.

11. The ester copolymer resin of claim 1 wherein said R consists of 10 to 70 mol % of an ethylene group and 90 to 30 mol % of a 1,4-cyclohexylene group and said cis/trans ratio is 0/100 to 30/70.

12. The ester copolymer resin of claim 10 wherein said R consists of 10 to 70 mol % of an ethylene group and 90 to 30 mol % of a 1,4-cyclohexylene group, and said cis/trans ratio is 0/100 to 30/70.

* * * * *